United States Patent
Sarma et al.

(10) Patent No.: US 12,200,682 B2
(45) Date of Patent: Jan. 14, 2025

(54) ENHANCED TRANSMISSION MEDIUM USAGE FOR COLLOCATED WIRELESS DEVICES

(71) Applicant: Cypress Semiconductor Corporation, San Jose, CA (US)

(72) Inventors: Munukutla Sandeep Sarma, Bangalore (IN); Raghavendra Kencharla, Bangalore (IN); Suprojit Mukherjee, West Bengal (IN); Ayush Sood, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 377 days.

(21) Appl. No.: 17/656,615

(22) Filed: Mar. 25, 2022

(65) Prior Publication Data
US 2023/0309084 A1  Sep. 28, 2023

(51) Int. Cl.
*H04W 72/12* (2023.01)
*H04W 4/80* (2018.01)
H04W 72/54 (2023.01)
H04W 84/12 (2009.01)

(52) U.S. Cl.
CPC ....... *H04W 72/1215* (2013.01); *H04W 72/54* (2023.01); *H04W 4/80* (2018.02); *H04W 84/12* (2013.01)

(58) Field of Classification Search
CPC ... H04W 4/80; H04W 72/54; H04W 72/1215; H04W 84/12
See application file for complete search history.

(56) References Cited

U.S. PATENT DOCUMENTS

| 10,805,936 | B1* | 10/2020 | Uln | H04L 5/0062 |
|---|---|---|---|---|
| 2009/0054009 | A1* | 2/2009 | Yang | H04W 16/14 |
| | | | | 455/78 |
| 2009/0196210 | A1* | 8/2009 | Desai | H04W 52/0225 |
| | | | | 370/311 |
| 2009/0257379 | A1* | 10/2009 | Robinson | H04W 16/14 |
| | | | | 455/552.1 |
| 2011/0090982 | A1* | 4/2011 | Chen | H04B 15/00 |
| | | | | 455/63.1 |
| 2012/0327920 | A1* | 12/2012 | Xhafa | H04W 74/0808 |
| | | | | 370/338 |
| 2013/0155931 | A1* | 6/2013 | Prajapati | H04B 15/00 |
| | | | | 370/336 |

(Continued)

*Primary Examiner* — Melanie Jagannathan

(57) ABSTRACT

Systems, methods, and devices improve medium usage of wireless devices. Methods include determining, using one or more processors, multiple protection frames should be used for a first wireless radio and a second wireless radio based, at least in part, on an interference parameter, wherein the first wireless radio and the second wireless radio are collocated in a same wireless device. Methods also include determining, using the one or more processors, one or more transmission parameters associated at least one of the wireless radios, the one or more transmission parameters representing a first duty cycle of the first wireless radio and a second duty cycle of the second wireless radio. Methods further include determining, using the one or more processors, a number of protection frames and a protection frame duration based, at least in part, on the one or more transmission parameters.

17 Claims, 8 Drawing Sheets

(56) References Cited

U.S. PATENT DOCUMENTS

| | | | |
|---|---|---|---|
| 2013/0201884 A1* | 8/2013 | Freda | H04W 74/0833 370/278 |
| 2014/0004865 A1* | 1/2014 | Bhargava | H04W 74/0816 455/445 |
| 2014/0269633 A1* | 9/2014 | Behnamfar | H04L 5/0073 370/336 |
| 2014/0328271 A1* | 11/2014 | Chen | H04W 52/0219 370/329 |
| 2015/0024687 A1* | 1/2015 | Rawat | H04W 4/80 455/41.2 |
| 2016/0255644 A1* | 9/2016 | Malik | H04W 74/0816 370/329 |
| 2016/0262152 A1* | 9/2016 | Yoo | H04W 56/002 |
| 2016/0262184 A1* | 9/2016 | Wentink | H04L 67/52 |
| 2017/0188380 A1* | 6/2017 | Hsu | H04W 74/0816 |
| 2017/0332286 A1* | 11/2017 | Lepp | H04W 72/52 |
| 2017/0347366 A1* | 11/2017 | Ling | H04W 72/1215 |
| 2018/0098292 A1* | 4/2018 | Gulati | H04W 52/283 |
| 2018/0235011 A1* | 8/2018 | Hsu | H04W 74/0816 |
| 2018/0242339 A1* | 8/2018 | Choudhary | H04W 4/80 |
| 2019/0174418 A1* | 6/2019 | Kencharla | H04W 52/0216 |
| 2019/0373639 A1* | 12/2019 | Elliott | H04L 69/08 |
| 2020/0100266 A1* | 3/2020 | Kencharla | H04W 16/14 |
| 2021/0385865 A1* | 12/2021 | Mueck | H04W 74/0816 |
| 2023/0100850 A1* | 3/2023 | Dass | H04W 76/14 370/329 |
| 2024/0129724 A1* | 4/2024 | Cariou | H04W 84/12 |

\* cited by examiner

ENHANCED TRANSMISSION MEDIUM USAGE FOR COLLOCATED WIRELESS DEVICES

TECHNICAL FIELD

This disclosure generally relates to wireless devices, and more specifically, to improving medium usage of such wireless devices.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. Conventional techniques for handling activity of collocated wireless radios remain limited because they are not able to efficiently utilize such transmission media with multiple collocated wireless radios while also providing sufficient interference isolation.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include collocated radios, and such collocated radios may share a transmission medium. Such a transmission medium may include shared hardware, and may thus involve coexistence operations that enable the two collocated radios to share resources. To prevent interference between the collocated radios, protection frames may be used to quiet other network traffic. For example, a protection frame used by a Wi-Fi radio may be a clear-to-send-to-self (CTS-to-Self) frame which may temporarily suspend network traffic for the Wi-Fi radio. During this period of time, the collocated Bluetooth radio may receive network traffic without interference from the Wi-Fi radio. Conventional implementations of such frames remain limited because they are not able to efficiently contour the duration of the CTS-to-Self frames to the activity of the Bluetooth radios. For example, a CTS-to-Self frame may be far longer than a Bluetooth receive period, thus resulting in wasted usage of the transmission medium in which neither the Bluetooth radio or the Wi-Fi radio is able to use it.

Embodiments disclosed herein provide the ability to determine protection frame numbers and durations to ensure that the duration of the protection measures is closely contoured to the activity of a collocated radio, and wasted usage of the transmission medium is reduced. As will be discussed in greater detail below, various interference parameters and power parameters may be used to determine a number and duration of protection frames. The protection frames may then be transmitted in an overlapping and daisy chained manner throughout the duration of the activity of the collocated radio. Accordingly, the increased granularity of the implementation of protection frames, such as CTS-to-Self frames, enables the implementation of a protection period that closely maps to the activity of the collocated radio and does not overshoot such activity thereby avoiding usage waste of the transmission medium.

Figure 1:
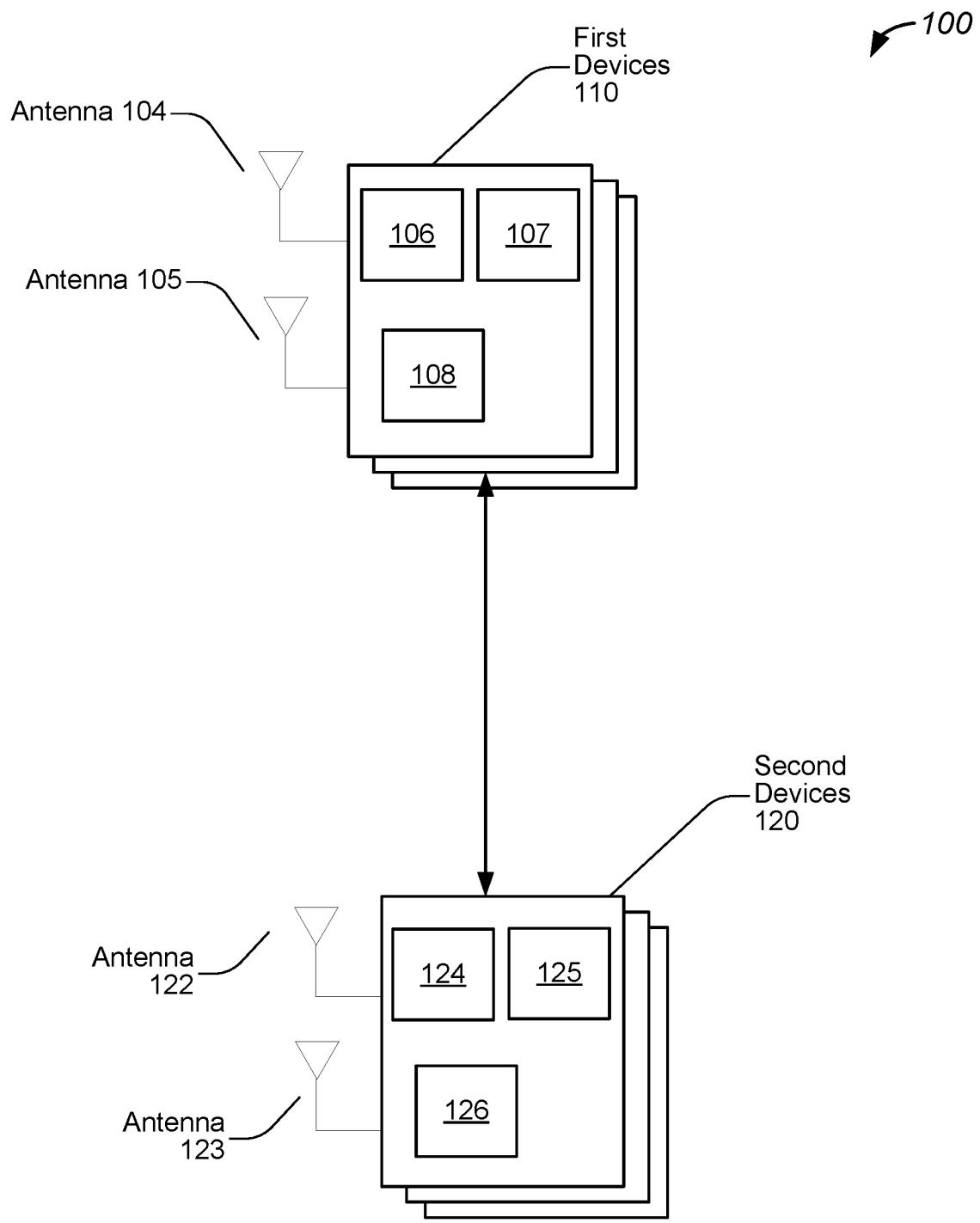
FIG. 1 illustrates an example of a system for improved wireless radio coexistence, configured in accordance with some embodiments.

FIG. 1 illustrates an example of a system for improved wireless radio coexistence, configured in accordance with some embodiments. As discussed above, various wireless devices may communicate with each other via one or more wireless communications media. For example, wireless devices may communicate with each other via a Wi-Fi connection or a Bluetooth connection. In various embodiments, the wireless devices may include collocated radios configured in accordance with such wireless protocols. As will be discussed in greater detail below, wireless devices disclosed herein and systems, such as system 100, that implement such wireless devices are configured to improve the efficiency of coexistence techniques used by wireless radios. Accordingly, embodiments disclosed herein enable improved determination of timing of protection operations between collocated radios, thus increasing the efficiency of the use of a shared transmission medium.

In various embodiments, system 100 may include first devices 110 which may be wireless devices. As discussed above, such wireless devices may be compatible with one or more wireless transmission protocols, such as a Wi-Fi protocol or a Bluetooth protocol. In some embodiments, first devices 110 are combination devices that include both Wi-Fi and Bluetooth radios. Accordingly, first devices 110 may include a Wi-Fi radio and a Bluetooth radio, as well as their associated processing logic. In some embodiments, radios included in first devices 110 may be compatible with a Bluetooth Low Energy specification and protocol, also referred to as Bluetooth Smart. In various embodiments, first devices 110 may be smart devices, such as those found in wearable devices, or may be monitoring devices, such as those found in smart buildings, environmental monitoring, and energy management. It will be appreciated that such wireless devices disclosed herein may be any suitable device, such as those found in cars, other vehicles, and even medical implants.

As shown in FIG. 1, various wireless devices may be in communication with each other via one or more wireless communications mediums. As shown in FIG. 1, first devices 110 may each include antennas, such as antenna 104 and antenna 105. First devices 110 may also include processing device 108 as well as radio 106 and radio 107. As used herein, a radio may refer to a transceiver as well as associated supporting processing hardware, as will be discussed in greater detail below with reference to FIG. 2. Moreover, such processing devices and radios may be configured to improve efficiency of coexistence techniques used by radio 106 and radio 107. More specifically, components of first devices 110 may be configured to dynamically determine durations of protection frames to increase the accuracy with which protection frames protect one radio from activity of another.

In some embodiments, system 100 may further include second devices 120 which may also be wireless devices. As similarly discussed above, second devices 120 may be compatible with one or more wireless transmission protocols, such as a Wi-Fi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include antennas, such as antenna 122 and 123, as well as processing device 126, radio 124 and radio 125. As discussed above, second devices 120 may also be configured to dynamically determine durations of protection frames to increase the accuracy with which protection frames protect one radio from activity of another. Additional details regarding such wireless activity prediction will be discussed in greater detail below.

Figure 2:
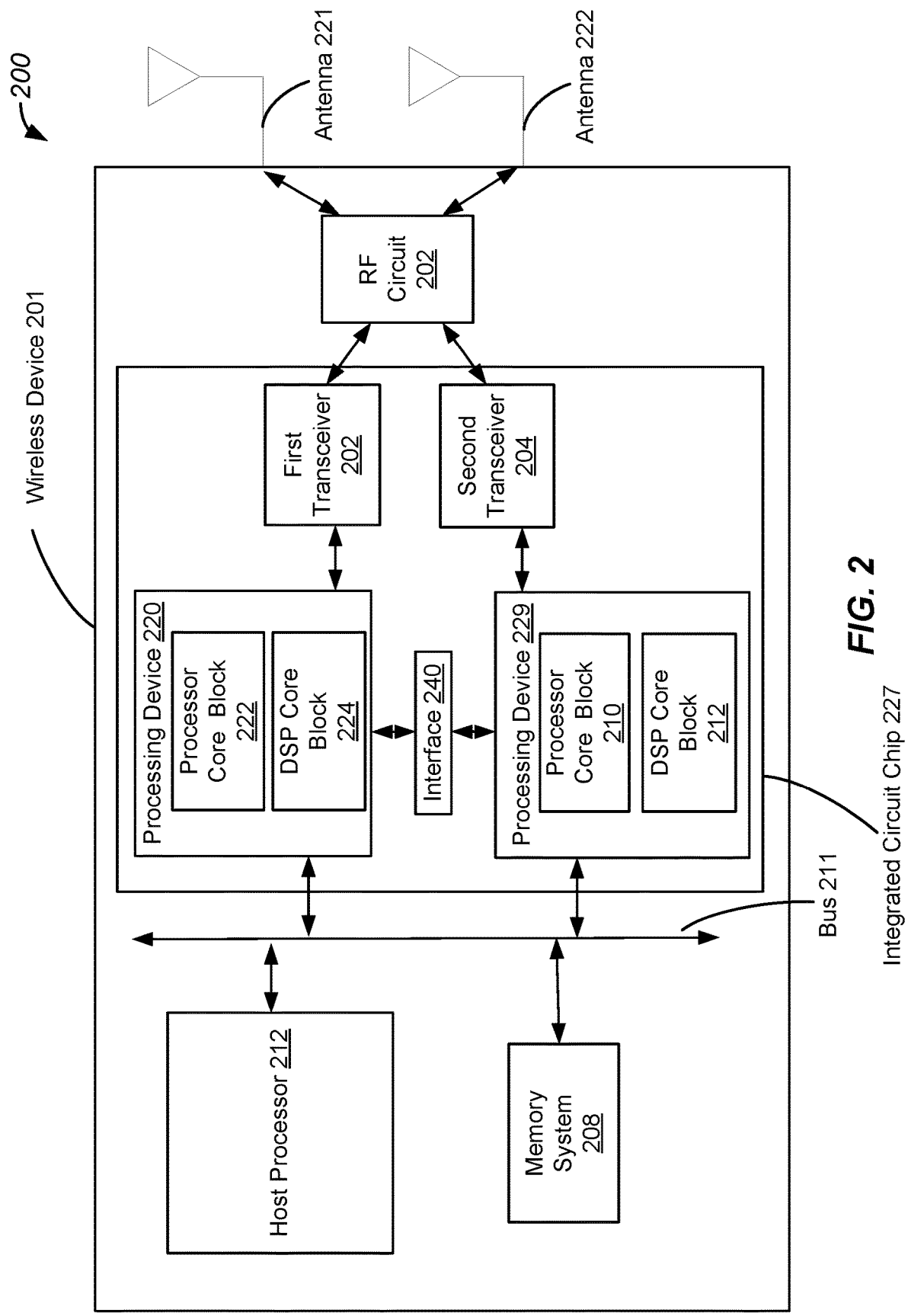
FIG. 2 illustrates an example of another system for improved wireless radio coexistence, configured in accordance with some embodiments.

FIG. 2 illustrates an example of a system for improved wireless radio coexistence, configured in accordance with some embodiments. More specifically, FIG. 2 illustrates an example of a system, such as system 200, that may include wireless device 201. It will be appreciated that wireless device 201 may be one of any of the wireless devices discussed above with reference to FIG. 1, such as first devices 110 and second devices 120.

In various embodiments, wireless device 201 includes collocated transceivers, such as first transceiver 202 and second transceiver 204, which may be included in radios such as radios 106, 107, 124, and 125 discussed above. In one example, system 200 includes first transceiver 202 which is configured to transmit and receive signals using a communications medium that may include antenna 221 or antenna 228. As noted above, first transceiver 202 may be a Bluetooth transceiver. For example, first transceiver 202 may be compatible with a Bluetooth Low Energy communications protocol. In some embodiments, system 200 also includes second transceiver 204 that may be a Wi-Fi transceiver. Accordingly, second transceiver 204 may be compatible with a Wi-Fi communications protocol, such as an 802.11ax protocol. In various embodiments, transceivers 202 and 204 each include a modulator and demodulator as well as one or more buffers and filters, that are configured to generate and receive signals via antenna 221 and/or antenna 228.

In various embodiments, system 200 further includes one or more processing devices, such as processing device 229 which may include logic implemented using one or more processor cores. Accordingly, processing device 229 is configured to implement logic for improved coexistence operations, as will be discussed in greater detail below. More specifically, processing device 229 includes processing elements configured to perform protection frame computations and implementation operations that will be described in greater detail below. Processing device 229 includes one or more components configured to implement a medium access control (MAC) layer that is configured to control hardware associated with a wireless transmission medium, such as that associated with a Wi-Fi transmission medium. In one example, processing device 229 may include processor core block 210 that may be configured to implement a driver, such as a Wi-Fi driver. Accordingly, as will be discussed in greater detail below with reference to FIG. 4, processing device 229 may include components associated with second transceiver 204, such as MAC layers and packet traffic arbiters. Processing device 229 may further include digital signal processor (DSP) core block 212 which may be configured to include microcode.

System 200 may also include processing device 220, which may also be configured to implement logic for communications operations via one or more wireless communications protocols. For example, as will be discussed in greater detail below, processing device 220 may include processing elements configured to perform communications operations in accordance with a Bluetooth protocol. In various embodiments, processing device 220 includes processor core block 222 and DSP core block 224. Furthermore, processor core block 222 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high-level data layers. Moreover, a controller stack includes a link management protocol, a host controller interface, a link layer which may be a low energy link layer, as well as various other timing critical layers. In various embodiments, processor core block 222 may be configured to implement schedulers, as will be discussed in greater detail below. Processing device 220 may further include digital signal processor (DSP) core block 224 which may be configured to include microcode.

In various embodiments, system 200 additionally includes interface 240 which is configured to provide communication between processing device 229 and processing device 220. Accordingly, components of the processing devices may communicate with each other via interface 240. As will be discussed in greater detail below, interface 240 may be a coexistence interface, such as a serial enhanced coexistence interface (SECI). It will be appreciated that interface 240 may be other types of interfaces as well, such as a 2-wire interface, 3-wire interface, or a 4-wire interface. In one example, the interface may be a global co-ex interface (GCI).

System 200 further includes radio frequency (RF) circuit 203 which is coupled to antenna 221 and antenna 228. In various embodiments, RF circuit 203 may include various components such as an RF switch, a diplexer, and a filter. Accordingly, RF circuit 203 may be configured to select an antenna for transmission/reception, and may be configured to provide coupling between the selected antenna, such as antenna 221 or antenna 228, and other components of system 200 via a bus, such as bus 211. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 2 illustrates system 200 as having multiple antennas, it will be appreciated that system 200 may be implemented with a single antenna.

System 200 includes memory system 208 which is configured to store one or more data values associated with coexistence and protection operations discussed in greater detail below. Accordingly, memory system 208 includes storage device, which may be a non-volatile random-access memory (NVRAM) configured to store such data values, and may also include a cache that is configured to provide a local cache. In various embodiments, system 200 further includes host processor 212 which is configured to implement processing operations implemented by system 200.

It will be appreciated that one or more of the above-described components may be implemented on a single chip, or on different chips. For example, first transceiver 202, second transceiver 204, processing device 229, and processing device 220 may be implemented on the same integrated circuit chip, such as integrated circuit chip 227. In another example, first transceiver 202, second transceiver 204, processing device 229, and processing device 220 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated circuit chip 227, may be implemented in a first location, while other components, such as antenna 221 and/or antenna 228, may be implemented in second location, and coupling between the two may be implemented via a coupler.

While various embodiments are disclosed herein with reference to communications protocols, such as Wi-Fi protocol, it will be appreciated that any suitable protocol may be used. For example, wireless devices disclosed herein may include wireless radios compatible with a ZigBee protocol. Accordingly, a wireless device may include a Wi-Fi radio and a ZigBee radio or a Thread radio which are collocated and implement coexistence techniques as disclosed herein.

Figure 3:
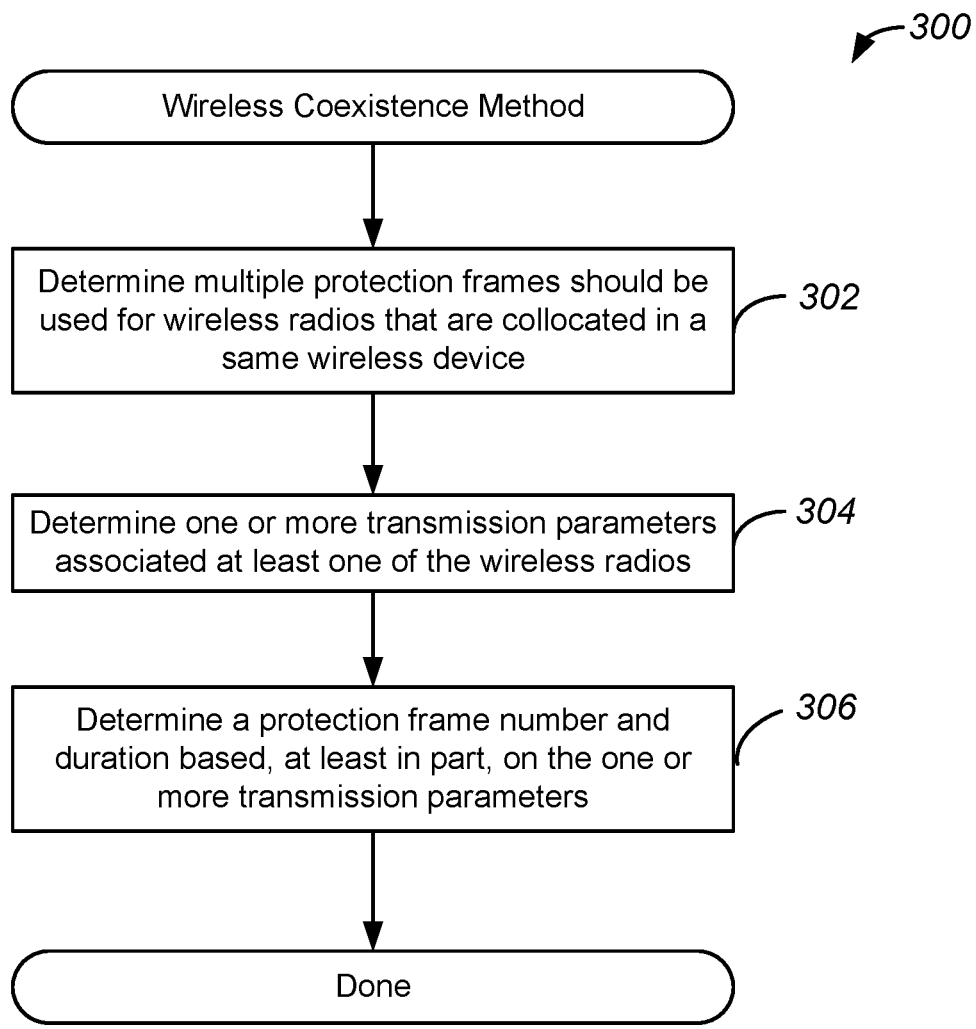
FIG. 3 illustrates a flow chart of an example of a method for improved wireless radio coexistence, implemented in accordance with some embodiments.

FIG. 3 illustrates a flow chart of an example of a method for improved wireless radio coexistence, implemented in accordance with some embodiments. As discussed above, collocated wireless radios may use protection frames to reduce interference between the wireless radios. As will be discussed in greater detail below, a method, such as method 300, may be performed to provide increased granularity and accuracy of the implementation of such protection frames, and in a manner compliant with power requirements. Such increased accuracy of the protection frames reduces the amount of wireless activity time wasted, and increases the efficiency of the usage of the transmission medium.

Method 300 may perform operation 302 during which it may be determined if multiple protection frames should be used for wireless radios that are collocated in a same wireless device. As discussed above, protection frames may be used to protect a first wireless radio from interference from a second wireless radio when the first wireless radio is receiving data. Accordingly, as will be discussed in greater detail below, various aspects of signal characteristics of the first and second wireless radios may be used to determine if a multiple-protection frame technique should be implemented. In one example, a required signal-to-noise-ratio (SNR) threshold may be used to make such a determination.

Method 300 may perform operation 304 during which one or more transmission parameters may be determined for at least one of the wireless radios. In various embodiments, the transmission parameters include one or more power parameters that may identify a power constraint to be applied for operation of one of the wireless radios. The transmission parameters may also include duty cycle information for each of the wireless radios, or some other temporal activity mapping. Additional details regarding such transmission parameters and power parameters are discussed in greater detail below.

Method 300 may perform operation 306 during which a protection frame number and duration may be determined based on the one or more transmission parameters. Accordingly, based on the transmission parameters and power parameters, a wireless device may determine how many protection frames should be used, and what the duration of the protection frames should be. As will be discussed in greater detail below, such protection frames may be daisy chained to implement the protection frames with improved granularity and accuracy.

Figure 4:
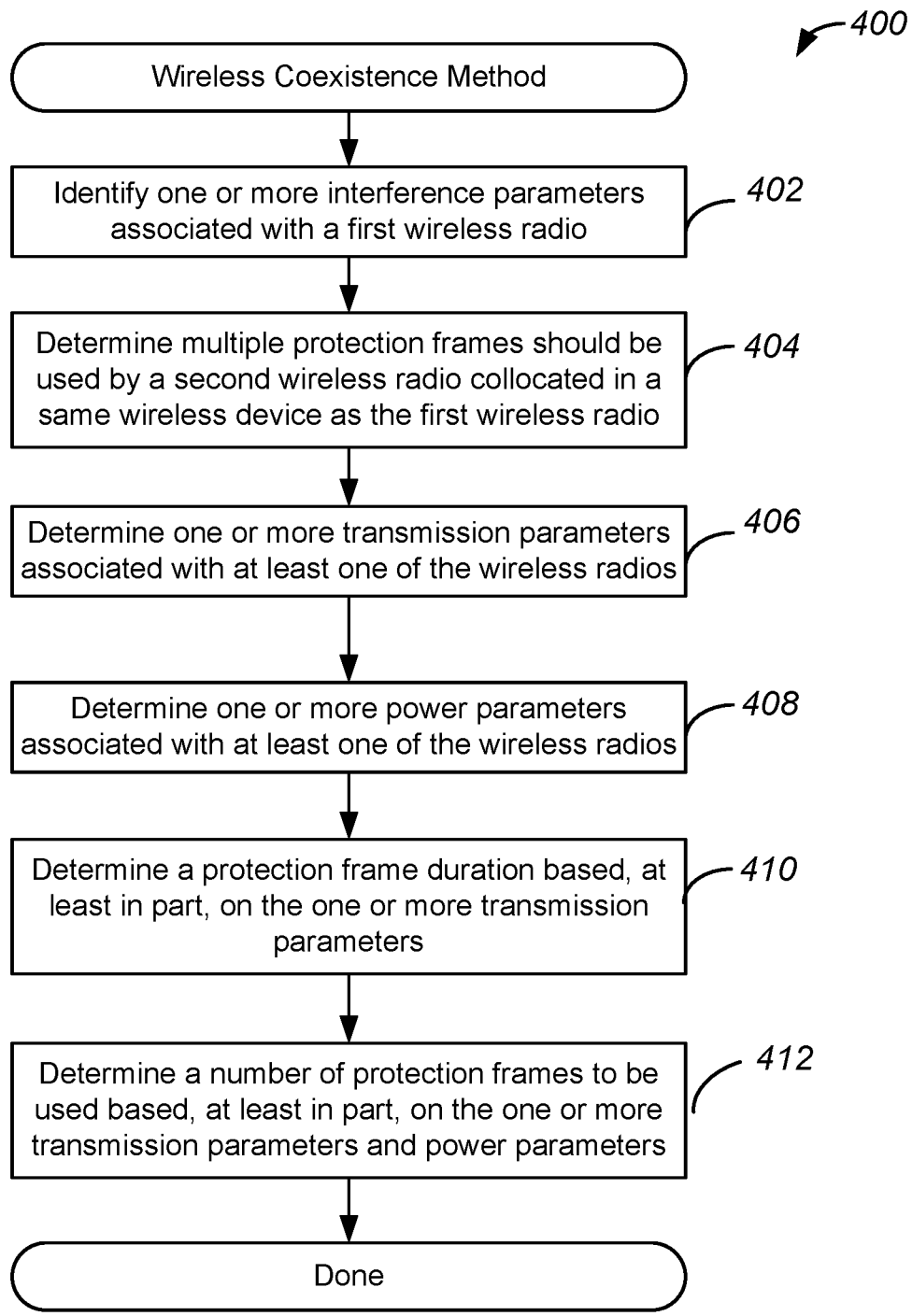
FIG. 4 illustrates a flow chart of another example of a method for improved wireless radio coexistence, implemented in accordance with some embodiments.

FIG. 4 illustrates a flow chart of another example of a method for improved wireless radio coexistence, implemented in accordance with some embodiments. As discussed above, collocated wireless radios may use protection frames to reduce interference between the wireless radios. As will be discussed in greater detail below, a method, such as method 400, may be performed to determine if multiple protection frames should be used, and if so, in what configuration. In this way, utilization of protection frames may be closely contoured to receiving activity of a particular wireless radio, and in a manner compliant with one or more operational power constraints of the wireless radios.

Method 400 may perform operation 402 during which one or more interference parameters associated with a first wireless radio may be identified. In various embodiments, the interference parameters may be used to describe or represent interference between the first wireless radio and a second wireless radio. As similarly discussed above, the first wireless radio may be a Bluetooth radio and the second wireless radio may be a collocated Wi-Fi radio. Accordingly, operational parameters, such as a channel of the Bluetooth radio and a center frequency of the Wi-Fi radio, may be identified. Additional signal quality metrics, such as a received signal strength indication (RSSI) value may also be identified.

Method 400 may perform operation 404 during which it may be determined if multiple protection frames should be used by a second wireless radio collocated in a wireless device with the first wireless radio. As similarly discussed above, signal characteristics of the first and second wireless radios may be used to determine if a multiple-protection frame technique should be implemented. As will be discussed in greater detail below with reference to at least FIG. 5, interference characteristics, signal strength characteristics, and gain characteristics of the first wireless radio may be used to make such a determination. For example, if a signal strength metric minus an in-band interference is greater than an SNR threshold value, multiple protection frames may be used.

Method 400 may perform operation 406 during which one or more transmission parameters may be identified. As similarly discussed above, the transmission parameters include duty cycle information for each of the wireless radios, or some other temporal activity mapping. More specifically, such duty cycle information may identify how active a particular radio, such as the second wireless radio is for a particular application for which data is being transmitted and received. Additional details regarding such transmission parameters and power parameters are discussed in greater detail below with reference to at least FIG. 6.

Method 400 may perform operation 408 during which one or more power parameters may be identified. As similarly discussed above, the one or more power parameters may identify a power constraint to be applied for operation of one of the wireless radios. Accordingly, the power parameters may identify an amount of transmission power the multiple protection frames are allowed to use. Additional details regarding such transmission parameters and power parameters are discussed in greater detail below with reference to at least FIG. 6.

Method 400 may perform operation 410 during which a protection frame duration may be determined based, at least in part, on the one or more transmission parameters. In some embodiments, the protection frame duration may be determined based, at least in part, on activity of the second wireless radio. For example, if the second wireless radio is expected to be highly active, and to transmit a high amount of network traffic, a higher number of protection frames may be used because the relative increase in transmission power associated with the protection frames is relatively small. Accordingly, the power parameters may specify an acceptable percentage increase in transmit power, and such an acceptable percentage increase may be used in combination with an estimated transmit power of each frame to compute a number of protection frames allowed. Additional details regarding the determination of the duration of protection frames are discussed in greater detail below with reference to at least FIG. 6.

Method 400 may perform operation 412 during which a number of protection frames may be determined based, at least in part, on the one or more transmission parameters and power parameters. In various embodiments, the number of protection frames may be determined based on activity of the first wireless radio. For example, a duration of the receiving period of the first wireless radio may be divided by a number of protection frames to determine a number of protection frames to be used. Additional details regarding the determination of the number of protection frames are discussed in greater detail below with reference to at least FIG. 6. In various embodiments, protection frames, such as CTS-2-Self frames, are transmitted as long as an RF active signal is asserted. Thus, CTS-2-Self frames may be transmitted as long as an RF active signal is at a logical high value.

Figure 5:
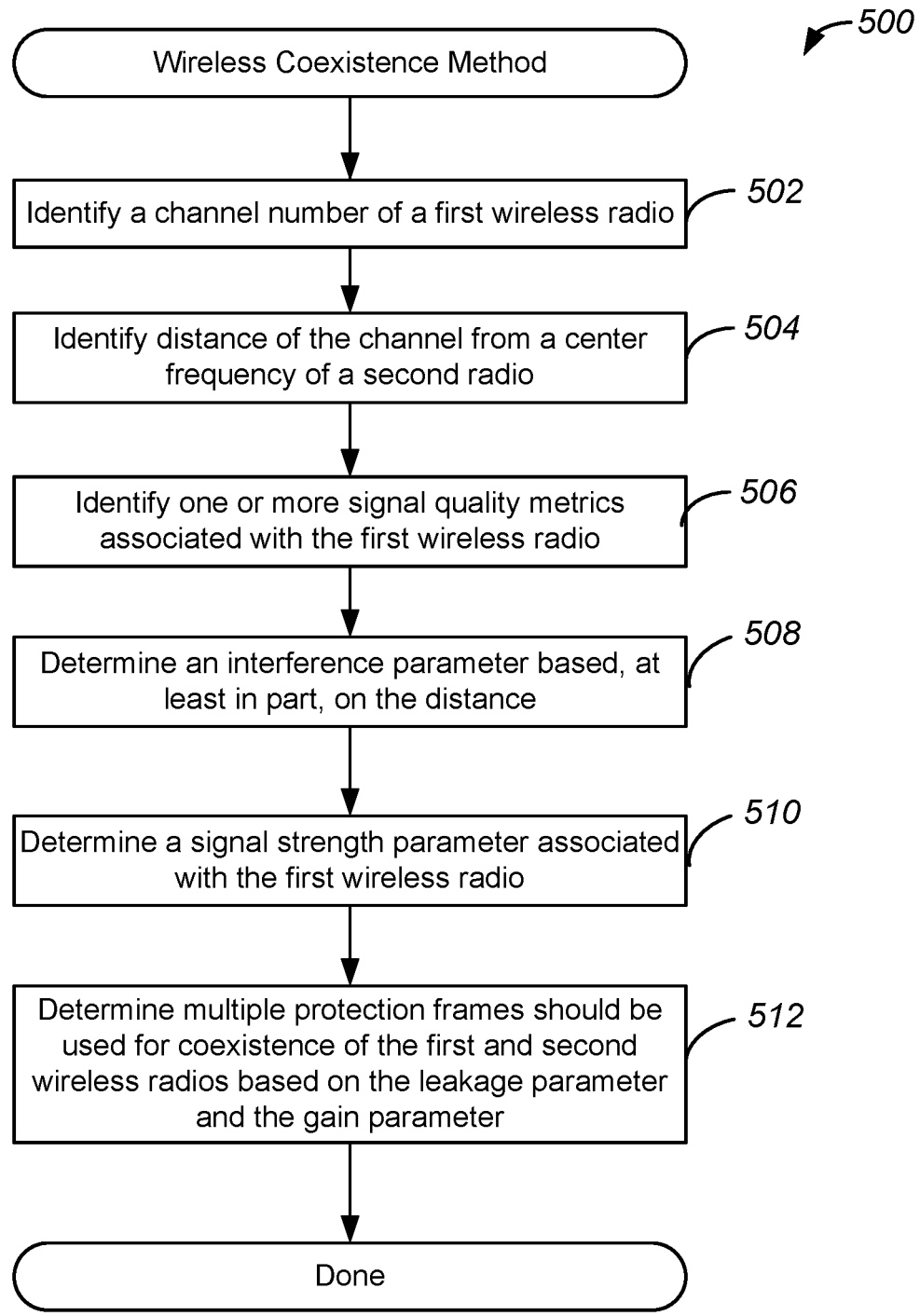
FIG. 5 illustrates a flow chart of yet another example of a method for improved wireless radio coexistence, implemented in accordance with some embodiments.

FIG. 5 illustrates a flow chart of yet another example of a method for improved wireless radio coexistence, implemented in accordance with some embodiments. As discussed above, collocated wireless radios may use protection frames to reduce interference between the wireless radios. As will be discussed in greater detail below, a method, such as method 500, may be performed to determine if multiple protection frames should be used. In this way, a wireless device may dynamically switch between single protection frame and multiple protection frame coexistence modalities.

Method 500 may perform operation 502 during which a channel number of the first wireless radio may be identified. In various embodiments, the channel number may be a designated sub-band of operational frequencies used by the first wireless radio. For example, the first wireless radio may be a Bluetooth radio. Accordingly, the Bluetooth protocol may specify operational frequencies to be used, and a division of such a frequency band into sub-bands. Accordingly, the first wireless radio may be operating on a particular sub-band, also referred to as a channel. The channel may have a defined range of operational frequencies as well as a center frequency for that range. During operation 502, such frequency information may be retrieved.

Method 500 may perform operation 504 during which a distance of the channel from a center frequency of a second wireless radio may be identified. Accordingly, a center frequency of the second wireless radio, which may be a Wi-Fi radio, may be compared with an operational frequency of the first wireless radio. Accordingly, a distance may be measured in Hz, and may for example, be 10 MHz, 20 MHz, or 30 MHz. It will be appreciated that different distances may result in different amounts of in-band interference experienced by the first wireless radio.

Method 500 may perform operation 506 during which one or more signal quality metrics may be identified. In various embodiments, the signal quality metric may be an RSSI value determined for the first wireless radio. Accordingly, during operation 506, the RSSI value may be retrieved. While embodiments disclosed herein describe an RSSI value, it will be appreciated that any suitable signal quality metric may be used.

Method 500 may perform operation 508 during which an interference parameter may be identified. In various embodiments, the interference parameter may be determined based on a combination of a leakage parameter, a gain parameter, and an isolation parameter. The leakage parameter may represent a leakage noise and may be determined by an analog-to-digital converter (ADC) of the first wireless radio. Accordingly, the interference parameter may be determined by adding the leakage parameter and the gain parameter, and then subtracting the isolation parameter. Accordingly, an interference parameter may be determined using equation 1 shown below:

$$I = L + G - S \qquad (1)$$

In equation 1, the term "S" may represent isolation, and may be measured and determined when a board is designed. For example, a manufacturer may measure S by sending a designated tone from one end to another end and measuring an isolation between channels during a calibration technique. Similarly, the term "G" may represent a front-end gain and may have been determined by a manufacturer. The term "L" may represent a leakage spectrum, and may be determined by a wireless communications protocol specification, such as an 802.11 standard. In some embodiments, an adjacent channel power rejection (ACPR) test is performed to measure leakage in different out of band frequencies. Such a test may have been performed by a manufacturer or part of a calibration procedure, and the measured results may be stored in memory or programmed in firmware.

Method 500 may perform operation 510 during which a signal strength parameter may be identified. In various embodiments, the signal strength parameter may be determined based on a signal strength metric, such as an RSSI value. The signal strength parameter may also be determined based on one or more characteristics of the first wireless radio, such as a front-end gain. In one example, the signal strength parameter is determined by adding the signal strength metric and the gain to form a composite signal strength metric.

Method 500 may perform operation 512 during which it may be determined if multiple protection frames should be used for the first and second wireless radios. As similarly discussed above, an SNR threshold value may be used to make such a determination. For example, the interference parameter may be subtracted from the signal strength parameter, and the result may be compared against the SNR threshold value. If the result is greater than the SNR threshold value, it may be determined that multiple protection frames should be used. If the result is less than the SNR threshold value, a single protection frame may be used. In various embodiments, the SNR threshold value is a designated value that may be determined by, for example, a wireless communications protocol specification. In one example, the SNR threshold value is determined based on a Bluetooth specification.

Figure 6:
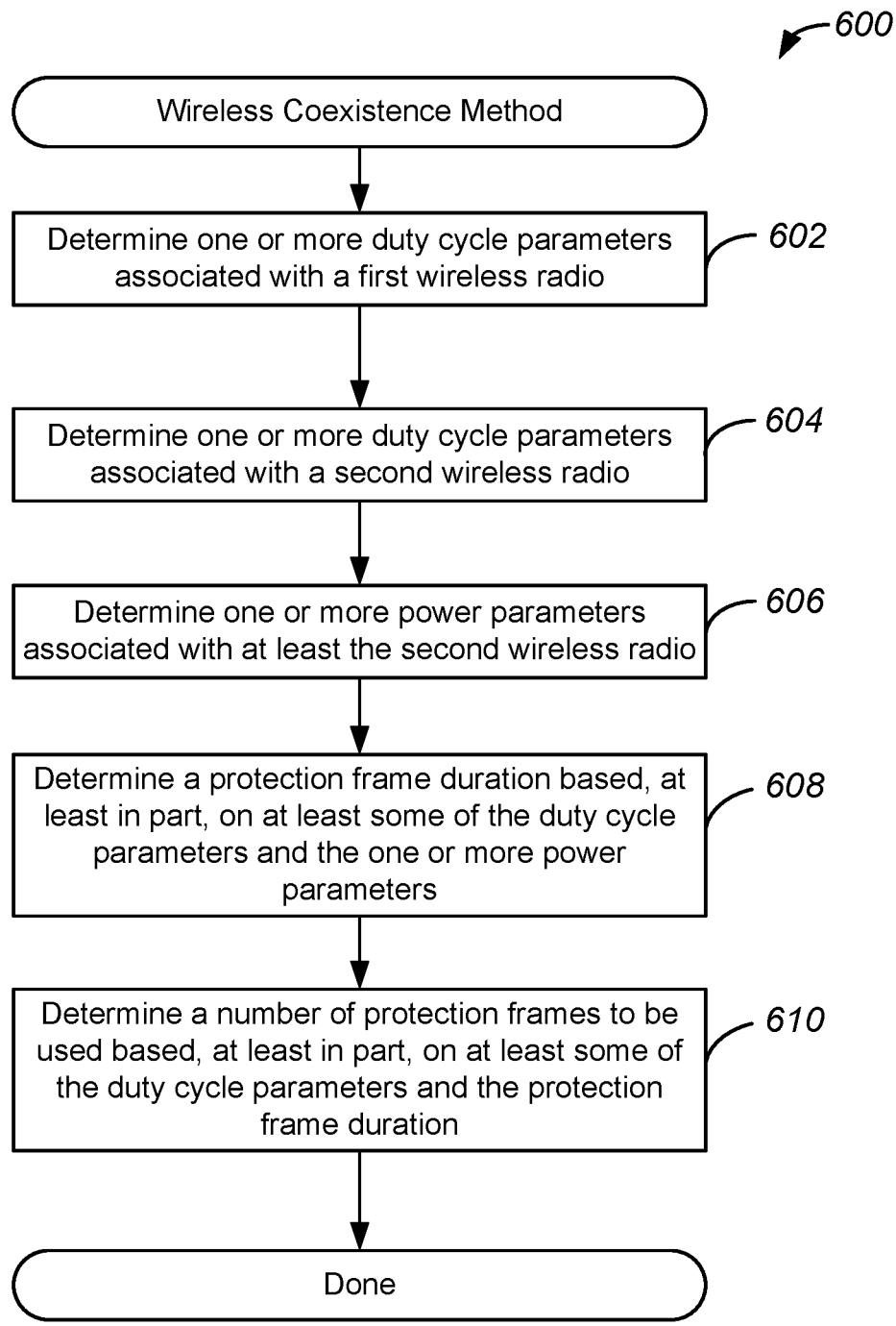
FIG. 6 illustrates a flow chart of an additional example of a method for improved wireless radio coexistence, implemented in accordance with some embodiments.

FIG. 6 illustrates a flow chart of an additional example of a method for improved wireless radio coexistence, implemented in accordance with some embodiments. As discussed above, collocated wireless radios may use protection frames to reduce interference between the wireless radios. As will be discussed in greater detail below, a method, such as method 600, may be performed to determine at what level of granularity the multiple protection frames should be implemented. More specifically, method 600 may determine a number and duration of protection frames that balances increased medium usage efficiency against various power consumption constraints.

Method 600 may perform operation 602 during which one or more duty cycle parameters associated with a first wireless radio may be determined. In various embodiments, the duty cycle parameters may identify an amount of activity of the first wireless radio, as well as other information, such as a timing of activity and a duration of activity. In various embodiments, the first wireless radio is a Bluetooth radio, and the activity may be receiving activity in which data is received by the first wireless radio. As similarly discussed above, such duty cycle parameters and amounts of activity may be determined based on the an application type. In one example, a user may determine whether the traffic will be transmit-centric or receive-centric, and further determine an estimated percentage of transmit or receive traffic. The user may also determine a granularity. In some embodiments, a real-time assessment of traffic direction and traffic frequency may be determined by firmware which may track and log traffic, and then used to form the basis of dynamically adjusting a granularity based on an end user's designated application power and performance estimations.

Method 600 may perform operation 604 during which one or more duty cycle parameters associated with a second wireless radio may be determined. As similarly discussed above, the duty cycle parameters may identify an amount of activity of the second wireless radio, as well as other information, such as a timing of activity and a duration of activity. In various embodiments, the second wireless radio may be a Wi-Fi radio, and the activity may be transmission activity, such as the transmission of frames and data packets.

Method 600 may perform operation 606 during which one or more power parameters may be determined for at least the second wireless radio. As similarly discussed above, the one or more power parameters may identify a power constraint to be applied for operation of one of the wireless radios. More specifically, the power parameters may identify an amount of transmission power the multiple protection frames are allowed to use. The transmission parameters may also include. Additional details regarding such transmission parameters and power parameters are discussed in greater detail below with reference to at least FIG. 6.

Method 600 may perform operation 608 during which a protection frame duration may be determined based on the one or more duty cycle parameters and the one or more power parameters. As similarly discussed above, the protection frame duration may be determined based, at least in part, on activity of the second wireless radio. For example, if the second wireless radio is expected to be highly active, and to transmit a high amount of network traffic, a higher number of protection frames may be used because the relative increase in transmission power associated with the protection frames is relatively small. In some embodiments, a length of time a protection frame occupies airtime is determined based on a modulation coding scheme (MCS) index. As similarly discussed above, a granularity, which may identify a number of protection frames and a length of each protection frame, may be determined based on a user's designated power and performance parameters. For example, a designated mapping may have been previously generated and stored to map power and performance requirements to particular granularities.

Method 600 may perform operation 610 during which a number of protection frames may be determined. In various embodiments, the number of protection frames may be determined based on activity of the first wireless radio. As discussed above, a duration of the receiving period of the first wireless radio may be divided by a number of protection frames to determine a number of protection frames to be used. In one example, the first wireless radio may be a Bluetooth radio and the second wireless radio may be a Wi-Fi radio. Thus, the number of protection frames may be determined by taking a duration of a receiving period of the Bluetooth radio and dividing it by the protection frame duration determined during operation 608. The result may be stored as a protection frame number.

Figure 7:
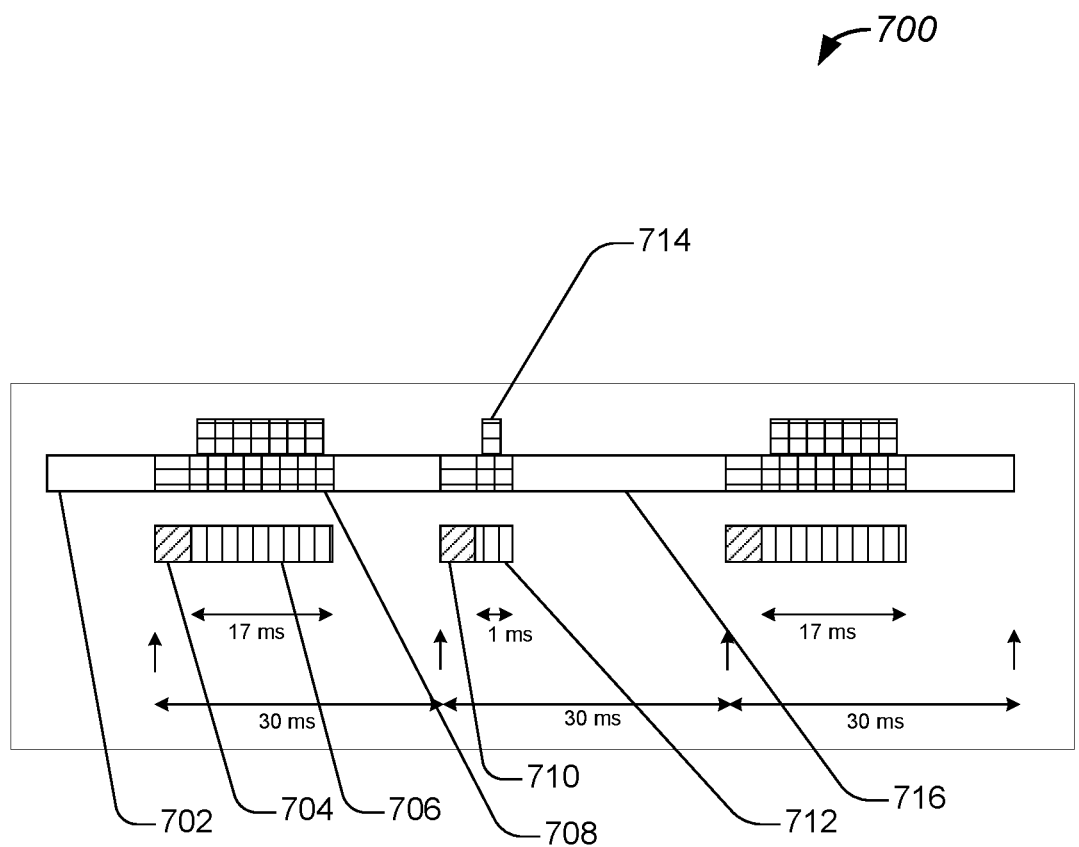
FIG. 7 illustrates a timing diagram of improved wireless radio coexistence, implemented in accordance with some embodiments.

FIG. 7 illustrates a timing diagram of improved wireless radio coexistence, implemented in accordance with some embodiments. Accordingly, diagram 700 illustrates an example of activity of collocated radios where a first wireless radio is a Bluetooth radio and a second wireless radio is a Wi-Fi radio. As shown in diagram 700, the second wireless radio may engage in transmit and receive activity during period 702. However, during period 704 and period 706, the first wireless radio may engage in transmit and receive activity, respectively. During this time, the first wireless radio transmits protection frames 708. As shown in diagram 700, protection frames are overlapping and daisy chained to ensure protection during period 706. Moreover, a number and size of protection frames 708 has been configured based on the activity of the first wireless radio.

Diagram 700 further illustrates period 710 and period 712 which may be an additional transmit and receive period of the first wireless radio, respectively. Moreover, protection frames 714 illustrate how a number of protection frames used has been reduced to closely conform to the shorter period 712. The increased accuracy of the duration of protection frames 714 enables a greater active period of the second wireless radio, such as period 716, and reduces wasted time for the transmission medium.

Figure 8:
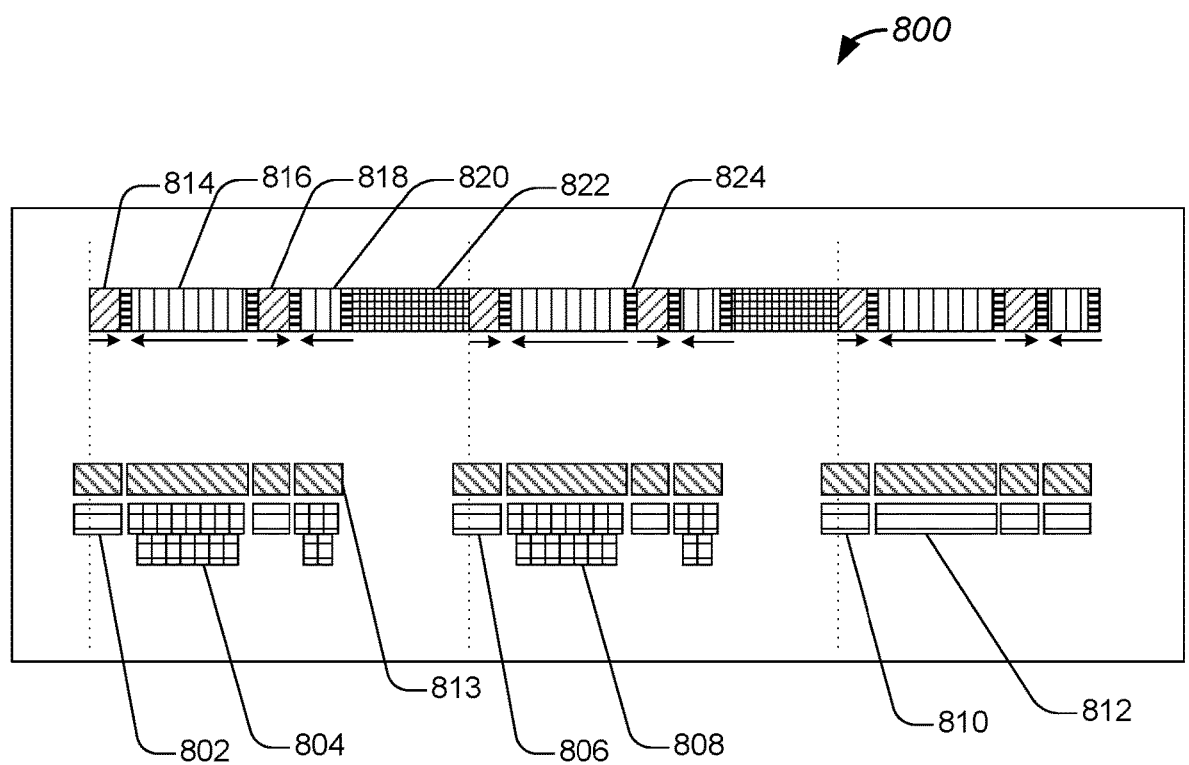
FIG. 8 illustrates another timing diagram of improved wireless radio coexistence, implemented in accordance with some embodiments.

FIG. 8 illustrates another timing diagram of improved wireless radio coexistence, implemented in accordance with some embodiments. As shown in diagram 800, multiple iterations of coexistence methods may be performed in succession. Accordingly, during a first period, it may be determined that multiple protection frames should be used, and protection frames 802 and 804 may be used by the second wireless radio. As shown by protection frames 804, multiple daisy chained protection frames are used, as similarly discussed above. Similarly, in a subsequent period, it may again be determined that multiple protection frames 806 and 808 should be used. In yet another subsequent period, it may be determined that a single protection frame should be used, and the system may switch to single protection frames 810 and 812. In this way, the determination and implementation of multiple protection frames may be performed periodically, and for designated periods of wireless activity.

As additionally shown in FIG. 8, RF active signals may be used during RF active blocks, such as block 913. Moreover, FIG. 8 additionally illustrates activity of wireless radios. For example, block 814 may be a Bluetooth transmission period, block 816 may be a Bluetooth receive period, block 818 may be an additional Bluetooth transmit period, and block 820 may be an additional Bluetooth receive period. Moreover, block 822 may be a Wi-Fi active period. Additionally, inter frame space (IFS) may also be included in, for example, blocks such as block 824.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   determining, using one or more processors, multiple protection frames should be used for a first wireless radio and a second wireless radio based, at least in part, on an interference parameter, wherein the first wireless radio and the second wireless radio are collocated in a same wireless device and wherein the interference parameter is determined based, at least in part, on a difference between a wireless channel of the first wireless radio and a center frequency of the second wireless radio;
   determining, using the one or more processors, one or more transmission parameters associated at least one of the wireless radios, the one or more transmission parameters representing a first duty cycle of the first wireless radio and a second duty cycle of the second wireless radio; and
   determining, using the one or more processors, a number of protection frames and a protection frame duration based, at least in part, on the one or more transmission parameters.

2. The method of claim 1, wherein the determining multiple protection frames should be used further comprises: determining a signal strength parameter for the first wireless radio; and determining multiple protection frames should be used in response to a result of the signal strength parameter minus the interference parameter being greater than a signal-to-noise ratio (SNR) threshold value.

3. The method of claim 2, wherein the signal strength parameter comprises a received signal strength indication (RSSI) value.

4. The method of claim 3, wherein the signal strength parameter is determined based on a combination of the RSSI value and a gain value of the first wireless radio.

5. The method of claim 1 further comprising:
   determining power parameters associated with second wireless radio, the power parameters representing a level of activity of the second wireless radio.

6. The method of claim 5 further comprising:
   determining the protection frame duration based, at least in part, on the second duty cycle of the second wireless radio and the power parameters.

7. The method of claim 6 further comprising:
   determining the number of protection frames based on the first duty cycle of the first wireless radio and the protection frame duration.

8. The method of claim 1, wherein the first wireless radio is a Bluetooth radio, and wherein the second wireless radio is a Wi-Fi radio.

9. A system comprising:
   a first wireless radio comprising a first transceiver and first processing elements, wherein the first wireless radio is compatible with a first wireless communications protocol;
   a second wireless radio comprising a second transceiver and second processing elements, wherein the second wireless radio is compatible with a second wireless communications protocol, wherein the first wireless radio is collocated with the second wireless radio in a wireless device, and wherein the second wireless radio is configured to:
   determine multiple protection frames should be used for a first wireless radio and a second wireless radio based, at least in part, on an interference parameter, wherein the first wireless radio and the second wireless radio are collocated in a same wireless device and wherein the interference parameter is determined based, at least in part, on a difference between a wireless channel of the first wireless radio and a center frequency of the second wireless radio;
   determine one or more transmission parameters associated at least one of the wireless radios, the one or more transmission parameters representing a first duty cycle of the first wireless radio and a second duty cycle of the second wireless radio; and
   determine a number of protection frames and a protection frame duration based, at least in part, on the one or more transmission parameters.

10. The system of claim 9, wherein the second wireless radio is further configured to:
    determine a signal strength parameter for the first wireless radio; and
    determine multiple protection frames should be used in response to a result of the signal strength parameter minus the interference parameter being greater than a signal-to-noise ratio (SNR) threshold value.

11. The system of claim 10, wherein the signal strength parameter comprises a received signal strength indication (RSSI) value.

12. The system of claim 9, wherein the second wireless radio is further configured to:
    determine power parameters associated with the second wireless radio, the power parameters representing a level of activity of the second wireless radio.

13. The system of claim 12, wherein the second wireless radio is further configured to:
    determine the protection frame duration based, at least in part, on the second duty cycle of the second wireless radio and the power parameters; and
    determine the number of protection frames based on the first duty cycle of the first wireless radio and the protection frame duration.

14. A device comprising:
first processing elements included in a first wireless radio and compatible with a first wireless communications protocol;
second processing elements included in a second wireless radio and compatible with a second wireless communications protocol, wherein the first and second processing elements are collocated in a wireless device, and wherein the second processing elements are configured to:
determine multiple protection frames should be used for the first wireless radio and the second wireless radio based, at least in part, on an interference parameter, wherein the first processing elements and the second processing elements are collocated in a same wireless device and wherein the interference parameter is determined based, at least in part, on a difference between a wireless channel of the first wireless radio and a center frequency of the wireless radio;
determine one or more transmission parameters associated at least one of the wireless radios, the one or more transmission parameters representing a first duty cycle of the first wireless radio and a second duty cycle of the second wireless radio; and
determine a number of protection frames and a protection frame duration based, at least in part, on the one or more transmission parameters.

15. The device of claim 14, wherein the second processing elements are further configured to:
determine a signal strength parameter for the first wireless radio; and
determine multiple protection frames should be used in response to a result of the signal strength parameter minus the interference parameter being greater than a signal-to-noise ratio (SNR) threshold value.

16. The device of claim 14, wherein the second processing elements are further configured to:
determine power parameters associated with the second wireless radio, the power parameters representing a level of activity of the second wireless radio.

17. The device of claim 16, wherein the second processing elements are further configured to:
determine the protection frame duration based, at least in part, on the second duty cycle of the second wireless radio and the power parameters; and
determine the number of protection frames based on the first duty cycle of the first wireless radio and the protection frame duration.

* * * * *